(12) United States Patent
Jiang et al.

(10) Patent No.: US 11,019,277 B2
(45) Date of Patent: May 25, 2021

(54) LED FLICKER REDUCTION FOR HIGH DYNAMIC RANGE IMAGING

(71) Applicants: Liangtao Jiang, San Jose, CA (US); Peng Lin, Pleasanton, CA (US)

(72) Inventors: Liangtao Jiang, San Jose, CA (US); Peng Lin, Pleasanton, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/543,760

(22) Filed: Aug. 19, 2019

(65) Prior Publication Data

US 2020/0177788 A1  Jun. 4, 2020

Related U.S. Application Data

(60) Provisional application No. 62/773,276, filed on Nov. 30, 2018.

(51) Int. Cl.
*H04N 5/235* (2006.01)
(52) U.S. Cl.
CPC ......... *H04N 5/2357* (2013.01); *H04N 5/2352* (2013.01)

(58) Field of Classification Search
CPC .......................... H04N 5/2357; H04N 5/2352
See application file for complete search history.

(56) References Cited

U.S. PATENT DOCUMENTS

| 9,584,704 | B2 | 2/2017 | Wan et al. |
| 10,072,974 | B2 | 9/2018 | Geurts |
| 10,136,084 | B1 | 11/2018 | Solheim et al. |
| 2017/0264845 | A1 | 9/2017 | Lee et al. |
| 2018/0109715 | A1* | 4/2018 | Mangla ..................... G06T 5/50 |
| 2019/0229138 | A1 | 7/2019 | Lee et al. |

* cited by examiner

*Primary Examiner* — Twyler L Haskins
*Assistant Examiner* — Fayez A Bhuiyan

(57) ABSTRACT

A system for capturing a high dynamic range (HDR) image comprises an image sensor comprising a split pixel including a first pixel having higher effective gain and a second pixel having lower effective gain. The second pixels exposed with a capture window capture at least a pulse emitted by a light emitting diode (LED) controlled by a pulse width modulation. A first HDR image is produced by a combination including an image produced by the second pixels, and images produced by multiple exposures of the first pixels. A weight map of LED flicker correction is generated from the difference of the image produced by second pixels and the images produced by the first pixels, and the flicker areas in the first HDR image are corrected with the weight map and the image from the second pixels.

17 Claims, 9 Drawing Sheets

LED FLICKER REDUCTION FOR HIGH DYNAMIC RANGE IMAGING

CROSS-REFERENCE TO RELATED APPLICATION

This application claims the benefits of U.S. Provisional Application No. 62/773,276, filed Nov. 30, 2018, which is hereby incorporated by reference.

FIELD OF THE INVENTION

This invention relates to light emitting diode (LED) flicker reduction, and more specifically relates to LED flicker reduction for high dynamic range (HDR) imaging.

BACKGROUND OF THE INVENTION

The brightness of a light emitting diode (LED) is commonly controlled by the pulse width modulation. For a certain pulse frequency, the width of the repeated pulses determines the brightness of the LED as sensed by a human. The wider the pulse is, the brighter the LED, as sensed by a human, is. The pulse frequency and the pulse width may not be synchronized with the frame frequency and the capture window of an image sensor. The image sensor may miss to capture an LED pulse, if the pulse width is narrow and if the pulse frequency is lower than the frame frequency of the image sensor. Consequently, some frames capture the LED, and some frames do not capture the LED, causing LED image flickering as captured by the image sensor.

Many new cars are equipped with LED head light, tail light, turn light, etc. Currently, many traffic lights are using LEDs as well. If the field of view of a camera, for example installed in a car, includes the cars and traffic lights having LEDs, the displayed image of the cars and the traffic lights may include flickering LED lights. The flickering LED light may be wrongly considered as come from emergency vehicles and may distract the driver and put the driver in danger.

Accordingly, image sensors that reduce or eliminate the LED flicker are demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
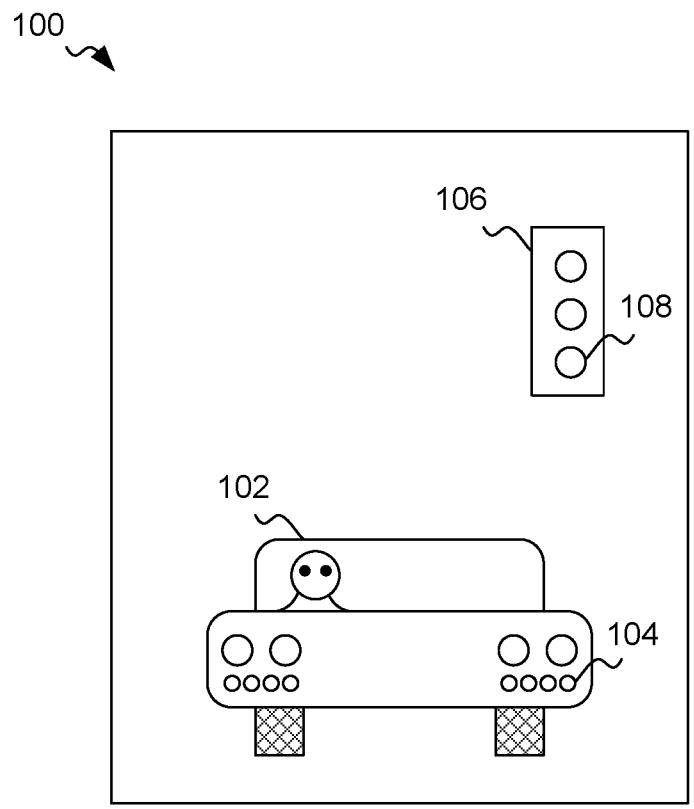
FIG. 1 shows an exemplary field of view of a camera, according to an embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 shows an exemplary field of view 100 of a camera, according to an embodiment of the invention. For example, the camera (not shown) is a camera installed in a car. In another environment, the camera may be a camera of a mobile phone, or any cameras. A car 102 having headlight including LEDs 104, and a traffic light 106 made from LEDs 108 are in field of view 100.

Figure 2:
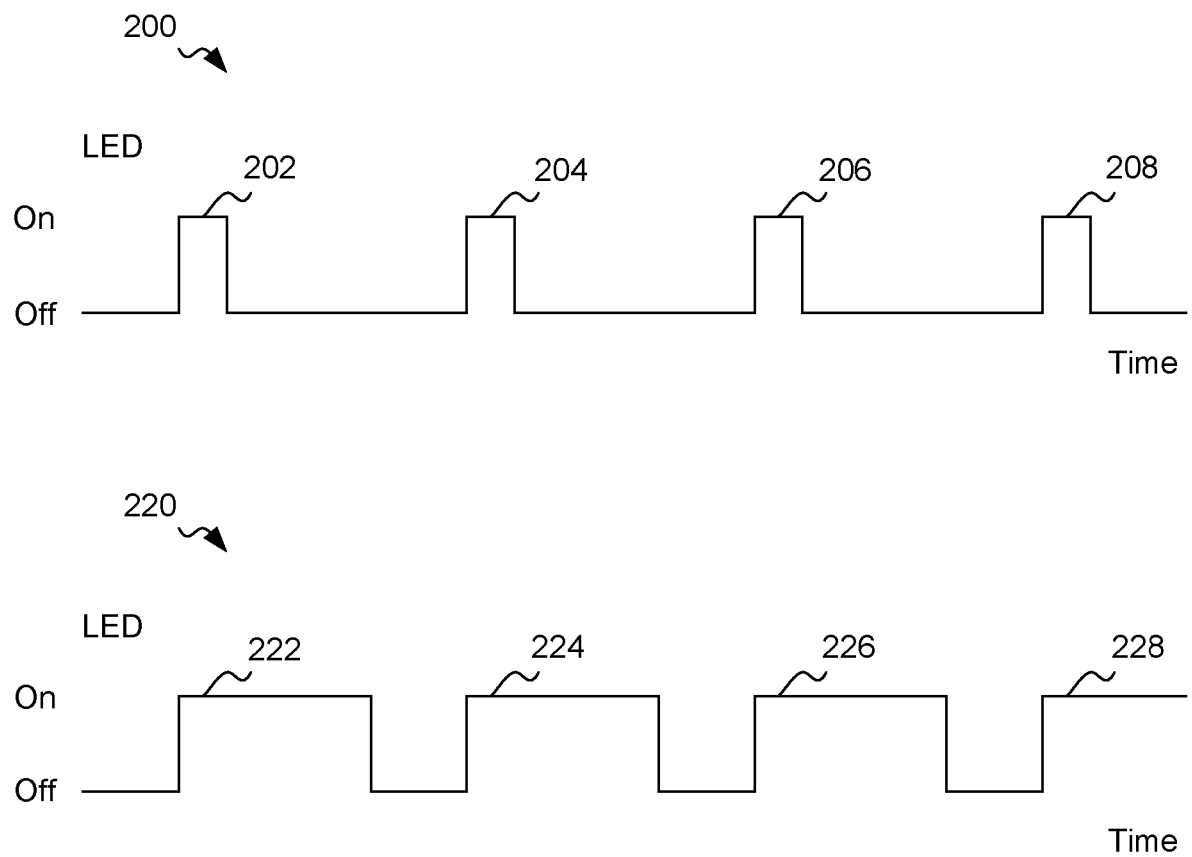
FIG. 2 shows an exemplary pulse width modulation, according to an embodiment of the invention.

The brightness of an LED is commonly controlled by the pulse width modulation (PWM). FIG. 2 shows an exemplary pulse width modulation, according to an embodiment of the invention. An exemplary temporal signal 200 of LED comprises a first pulse 202, a second pulse 204, a third pulse 206, a fourth pulse 208, and so on. Pulse 202-208 indicate that the LED is on. Although for human sensation, the LED appears constantly bright, actually, the LED is turned on and off repeatedly. When the LED is turned on, for example in response to pulse 202, the LED emits light. Another exemplary temporal signal 220 of LED comprises a first pulse 222, a second pulse 224, a third pulse 226, a fourth pulse 228, and so on. Pulses 222-228 indicate that the LED is on. Pulses in temporal signal 200 are repeated with the same frequency as pulses in temporal signal 220 being repeated. Pulse 222 is wider than pulse 202, pulse 224 is wider than pulse 204, pulse 226 is wider than pulse 206, and pulse 228 is wider than pulse 208. Accordingly, temporal signal 220 produces a brighter sensation of the LED light as compared with temporal signal 200.

Figure 3:
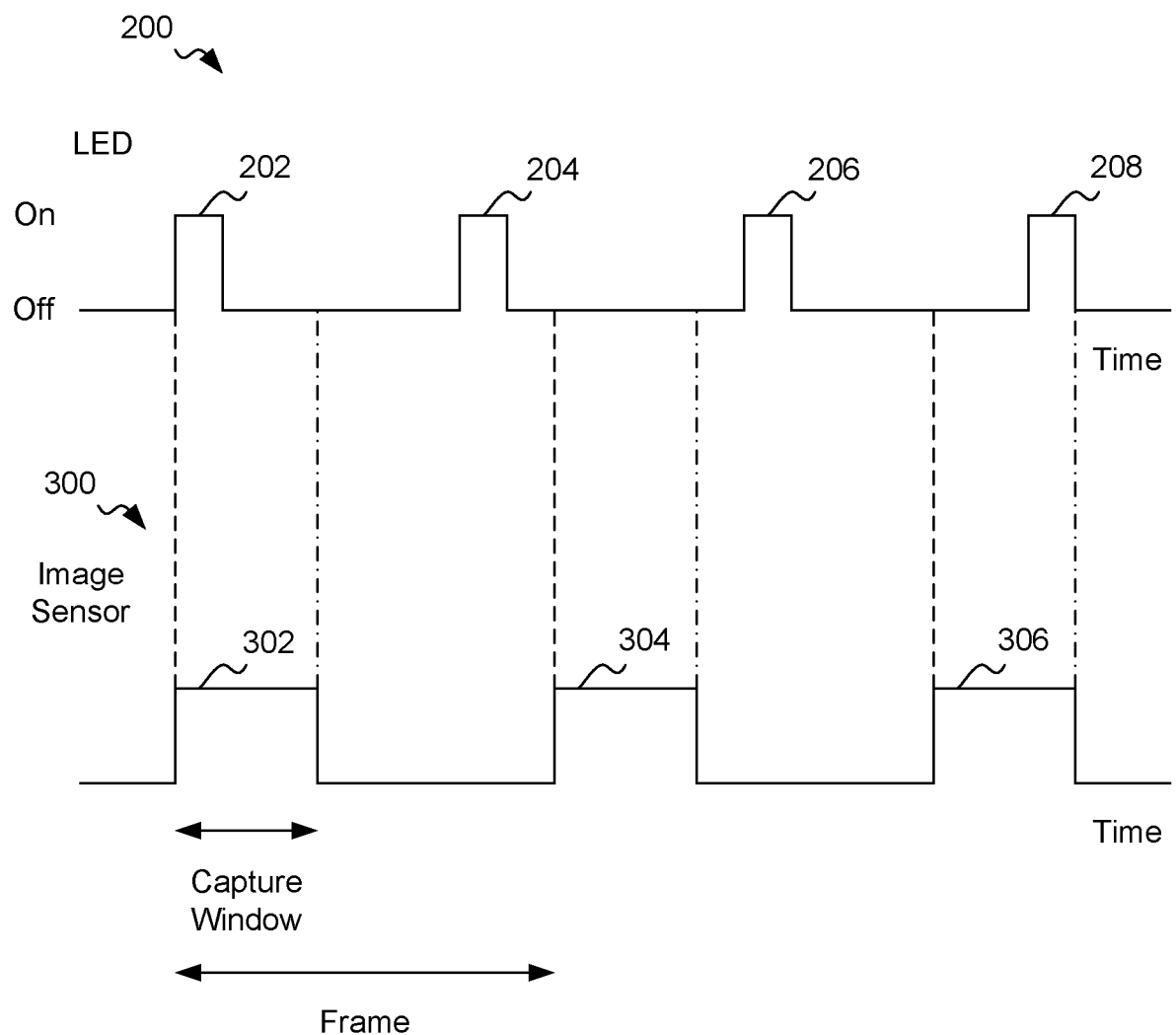
FIG. 3 shows the generation of LED flicker, according to an embodiment of the invention.

FIG. 3 shows the generation of LED flicker, according to an embodiment of the invention. Similar to FIG. 2, an exemplary temporal signal 200 of LED comprises a first pulse 202, a second pulse 204, a third pulse 206, a fourth pulse 208, and so on. Pulse 202-208 indicate that the LED is on. The camera capturing field of view 100 of FIG. 1 comprises an image sensor. An exemplary temporal signal 300 of image sensor comprises a first capture window 302 of a first frame, a second capture window 304 of a second frame, a third capture window 306 of a third frame, and so on. For example, first capture window 302 of image sensor will capture a first image including first pulse 202 of LED and missing second pulse 204 of LED. Second capture window 304 of image sensor will capture a second image missing third pulse 206 of LED. Third capture window 306 of image sensor will capture a third image including fourth pulse 208 of LED. Thus, some images include LED light, and some images do not include LED light. The LED appears flickering when the captured image is displayed frame by frame.

Figure 4:
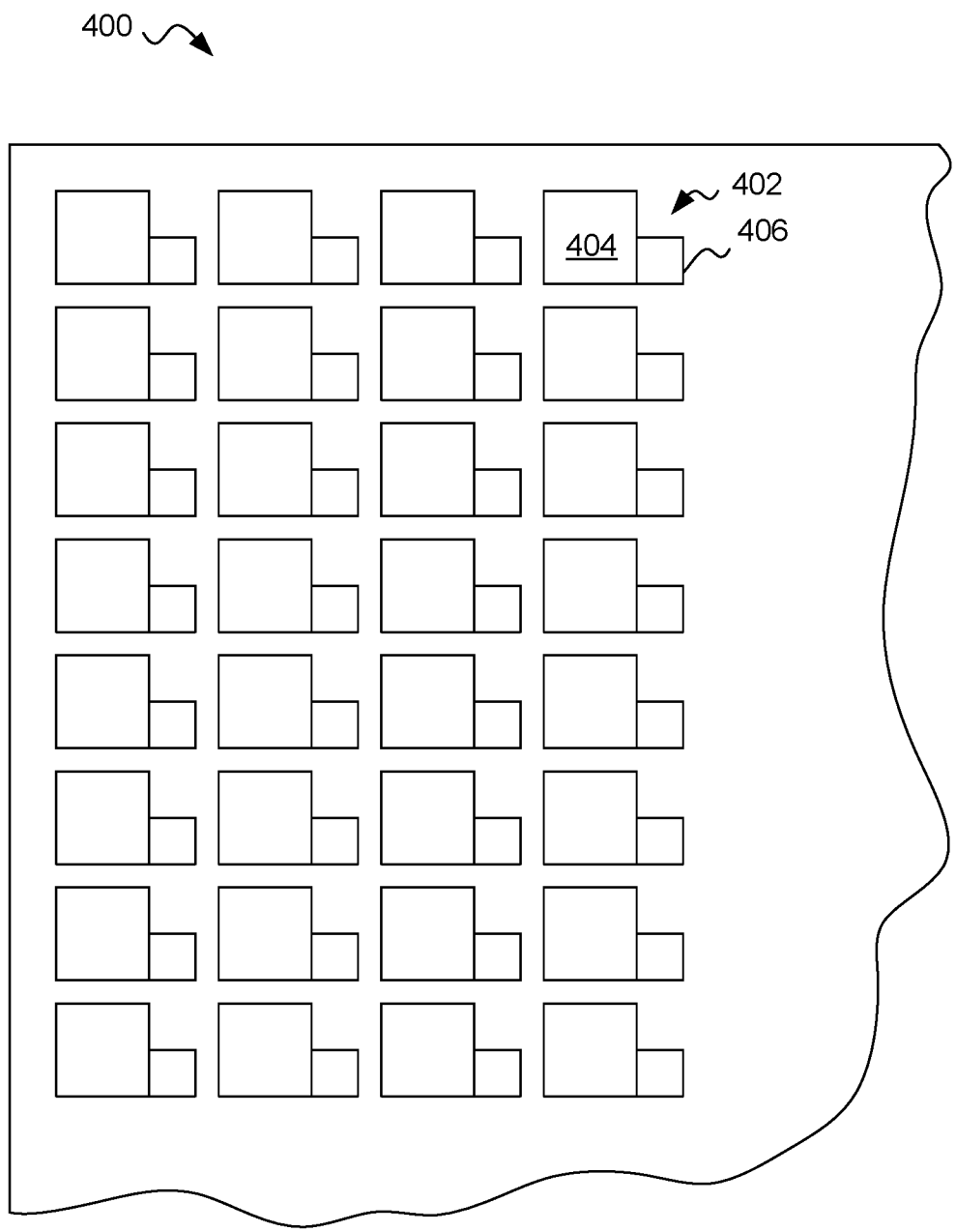
FIG. 4 shows an exemplary image sensor comprising a plurality pairs of split pixels, according to an embodiment of the invention.

FIG. 4 shows an exemplary image sensor 400 comprising a plurality of split pixels 402, according to an embodiment of the invention. A split pixel 402 include a first pixel, large photo-diode (LPD) 404, having higher effective gain and a second pixel, small photo-diode (SPD) 406, having lower effective gain. For example, the effective gain of LPD 404 may be about 100 times greater than that of SPD 406. In other words, the sensitivity of LPD 404 may be about 100 times greater than the sensitivity of SPD 406. In the disclosure, the word sensitivity and the word effective-gain may be used interchangeably. In an embodiment, the exposure time of SPD 406 may be set to equal or larger than 11 ms.

LPD 404 has a higher effective gain and SPD 406 has a lower effective gain because LPD 404 has a larger area and SPD 406 has a smaller area. Alternatively, LPD 404 and SPD 406 have the same area, but SPD 406 is covered by an attenuator such that the effective gain of SPD 406 is lower than the effective gain of LPD 404. Also, SPD 406 may not be covered by an attenuator but the effective gains of SPD 406 and LPD 404 may be controlled by an electric circuit and/or a photo detector designed such that the effective gain of SPD 406 is lower than the effective gain of LPD 404.

Figure 5:
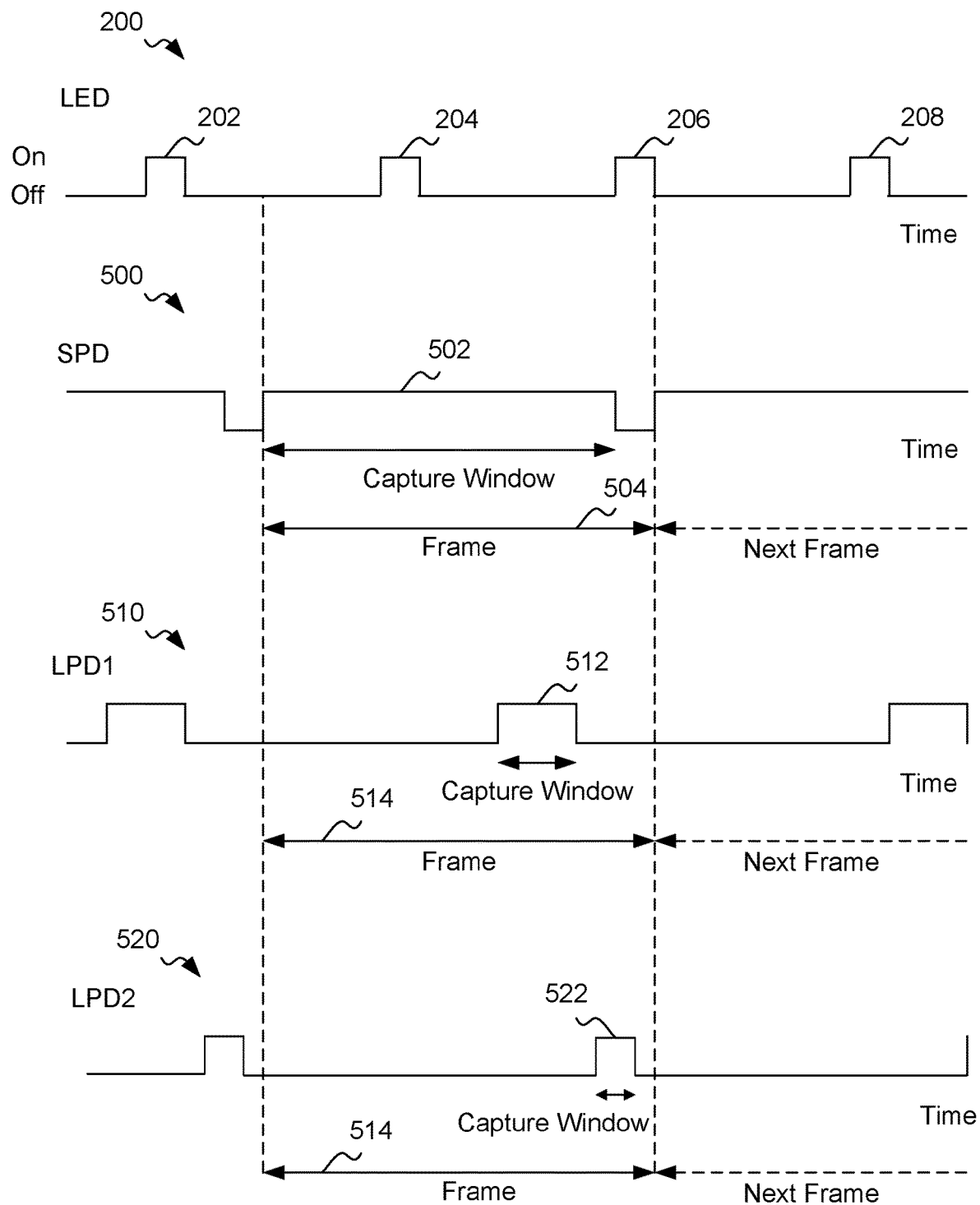
FIG. 5 shows an exemplary LED temporal signal, an exemplary small photo-diode (SPD) temporal signal, an exemplary large photo-diode (LPD) temporal signal with longer exposure time labeled as LPD1, and an exemplary LPD temporal signal with shorter exposure time labeled as LPD2, according to an embodiment of the invention.

FIG. 5 shows an exemplary LED temporal signal 200, an exemplary SPD temporal signal 500, an exemplary LPD temporal signal with longer exposure time labeled as LPD1 510, and an exemplary LPD temporal signal with shorter exposure time labeled as LPD2 520, according to an embodiment of the invention. Similar to FIG. 2, LED temporal signal 200 comprises a first pulse 202, a second pulse 204, a third pulse 206, a fourth pulse 208, and so on. Pulse 202-208 indicate that the LED is on.

Temporal signal 500 is a capturing temporal signal of SPD 406 comprising a capture window 502 within a second pixel frame 504. Capture window 200 is set long enough to capture at least a pulse, e.g., pulse 204, of LED temporal signal 200. In an embodiment, the sensitivity of SPD 406 is sufficiently low such that an exposure time of capture window 502 of SPD 406 may be set to equal to or larger than 11 ms. Capture window 502 will capture at least one LED pulse with frequency larger than 90 Hz, and no LED flickering will occur when the captures are replayed. Notice that a regular video frame rate is about 30 Hz. The sensitivity of SPD 406 is low. If the sensitivity of SPD 406 is too high, SPD 406 will capture an overexposed image because of its long exposure time.

In an embodiment, LPD 404 is exposed twice within a first pixel frame 514. The first exposure is expressed by LPD1 temporal signal 510, which has a capture window 512 having longer exposure time within frame 514. The second exposure after the first exposure is expressed by LPD2 temporal signal 520, which has a capture window 522 having shorter exposure time within same frame 514. First pixel frame 514 may be same as second pixel frame 504.

In conventional high dynamic range (HDR) imaging, for example, the exposure of LPD1 produces a first image A, and the exposure of LPD2 produces a second image B. The first image A is combined with the second image B in a single HDR image. The HDR image will show image A in the dark portion of the image, and will show image B in the bright portion of the image. Because, in the dark portion of the HDR image, image B having lower gain will be underexposed and have no contribution, and in the bright portion of the HDR image, image A having higher gain will be overexposed and have no contribution.

In an embodiment, a HDR image is produced from images captured by LPD1, LPD2, and SPD. In this manner, in addition to a conventional HDR image, the inclusion of a non-flickering LED image (e.g., image captured by SPD) may be assured. Thus, the produced HDR image will have no LED flickering. In an embodiment, a HDR image is a combination of an image captured by SPD, and at least two images captured by LPD having different exposure times (e.g., LPD1 and LPD2). In principle, the LDP may capture multiple images consecutively in a frame with different exposure times (capture windows), thus forming images of LPD1, LPD2, LPD3, and so on. A HDR image may be produced from images captured by LPD1, LPD2, LPD3, . . . and SPD.

Figure 6:
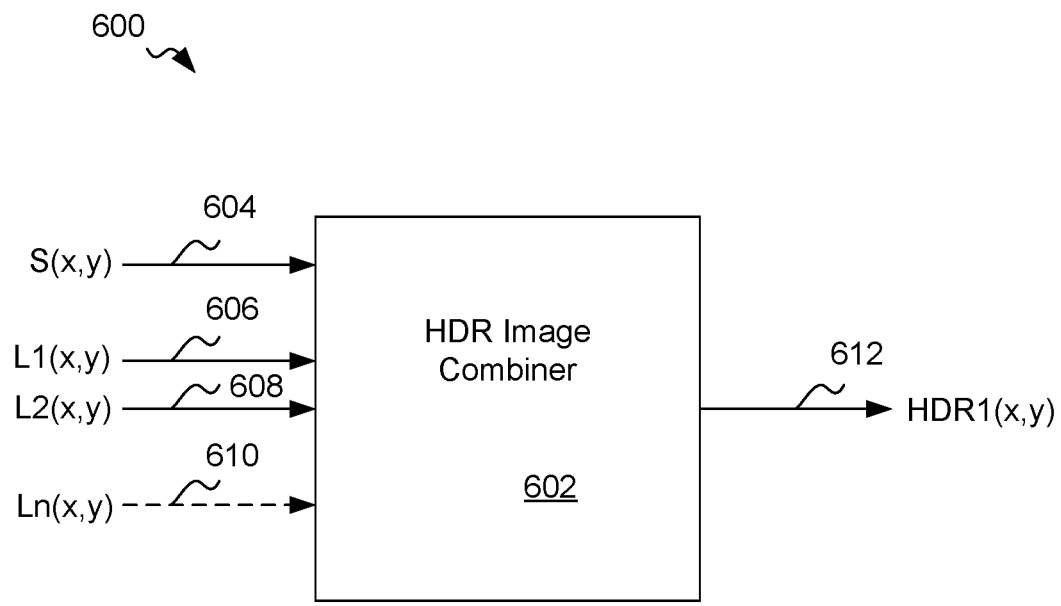
FIG. 6 shows high dynamic range (HDR) image combination, according to an embodiment of the invention.

FIG. 6 shows HDR image combination 600, according to an embodiment of the invention. A HDR image combiner 602 produces a first HDR image HDR1(x,y) by combining an image produced by the second pixel having lower effective gain (SPD), S(x,y) 604, a first image produced by the first exposure (LPD1) of the first pixel having higher effective gain (LPD), L1(x,y) 606, a second image produced by the second exposure (LPD2) of the first pixel having higher effective gain (LPD), L2(x,y) 608, and a series of images captured by the same LPD with different exposure times, including an image captured by the same LPD with a n-th exposure time Ln(x,y) 610. S(x,y) is a normalized image data produced by SPD, L1(x,y) is a normalized image data produced by LPD with first exposure time, L2(x,y) is a normalized image data produced by LPD with second exposure time, and so on. Thus, S(x,y), L1(x,y), L2(x,y), Ln(x,y) are in the same magnitude scale.

For example, for HDR1(x,y) produced by S(x,y), L1(x,y), and L2(x,y) only, HDR1(x,y) may be expressed as:

$$HDR1(x, y) = \frac{[a(x, y)S(x, y) + b(x, y)L1(x, y) + c(x, y)L2(x, y)]}{[a(x, y) + b(x, y) + c(x, y)]}$$

where a(x,y), b(x,y), and c(x,y) are coefficients, which are functions of (x,y), which may be determined by inspecting whether a pixel at (x,y) is underexposed, overexposed, or normally exposed.

Figure 7:
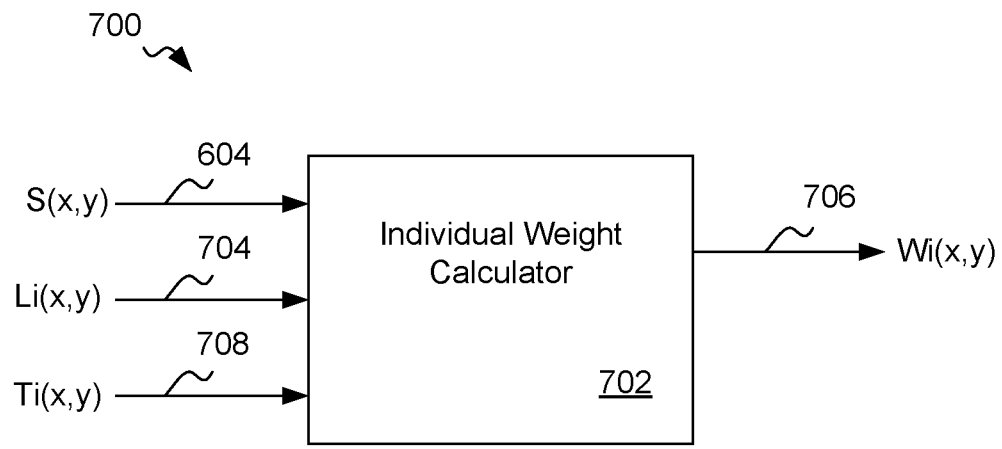
FIG. 7 shows individual weight calculation, according to an embodiment of the invention.

FIG. 7 shows individual weight calculation 700, according to an embodiment of the invention. An individual weight calculator 702 calculates an individual weight Wi(x,y) 706 for each Li(x,y) 704, where i may be 1, 2, 3, ... n. Li(x,y) is the image captured by LPD with an i-th exposure time. For example, individual weight Wi(x,y) 706 may be proportional to an absolute value of a difference between the image captured by SPD S(x,y) 604 and the image captured by LPD with an i-th exposure time Li(x,y) 704. The absolute value may be expressed as |S(x,y)−Li(x,y)|. Wi(x,y) is a function of the value of |S(x,y)−Li(x,y)| and a noise model based threshold Ti(x,y) 708. Wi(x,y) is larger when |S(x,y)−Li(x,y)| is larger. Wi(x,y) is zero when |S(x,y)−Li(x,y)| is smaller than Ti(x,y). Individual weight Wi(x,y) is defined 0≤Wi(x,y)≤1, which is:

$$W_i(x,y) = W_i\{|S(x,y) - L_i(x,y)|, T_i(x,y)\}$$

Figure 8:
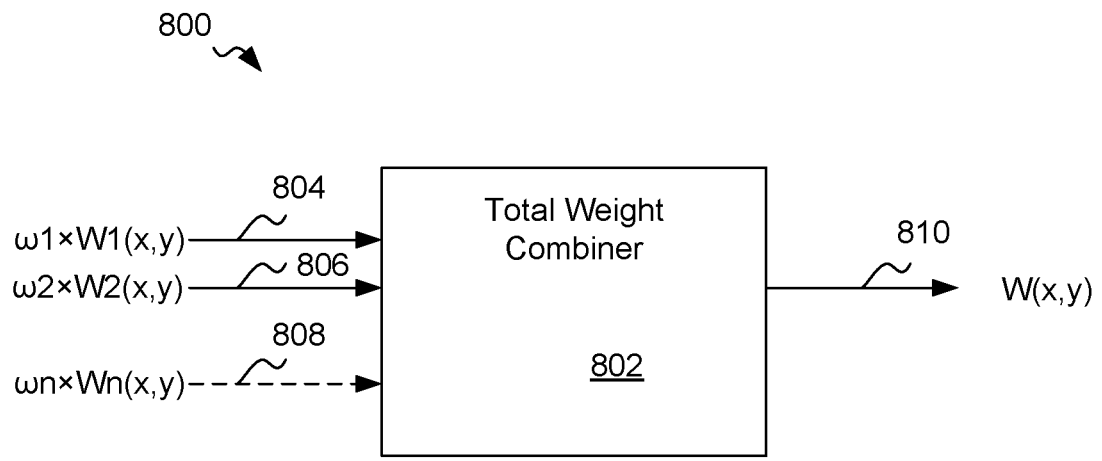
FIG. 8 shows total weight combination, according to an embodiment of the invention.

FIG. 8 shows total weight combination 800, according to an embodiment of the invention. A total weight combiner 802 provides a total weight W(x,y) 810. For example, total weight W(x,y) 810 may be a normalized weighted summation of all individual weights including a first weight W1(x,y) 804, a second weight W2(x,y) 806, and a n-th weight Wn(x,y) 808. ωi is the weight of each channel, which is decided according to the exposure ratio between Li(x,y) and S(x,y). Total weight W(x,y) is normalized that its value is between zero and unity, 0≤W(x,y)≤1.

$$W(x, y) = \frac{1}{K}\sum_{i=1}^{k} \omega_i W_i(x, y)$$

$$K = \sum_{i=1}^{k} \omega_i$$

Figure 9:
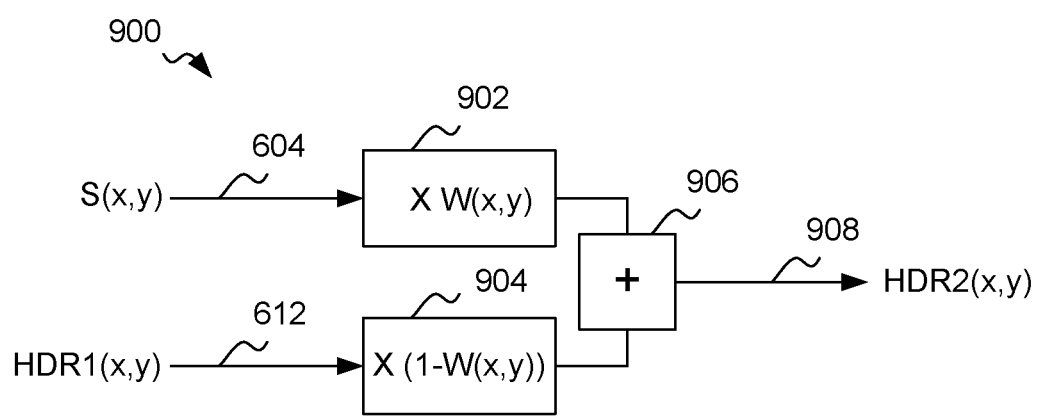
FIG. 9 shows final flicker correction, according to an embodiment of the invention.

FIG. 9 shows a processor 900 to perform final flicker correction, according to an embodiment of the invention. In an embodiment, the image captured by SPD S(x,y) 604 is multiplied by W(x,y) 810 in a block 902, and first HDR image HDR1 (x,y) 612 is multiplied by (1−W(x,y)) in a block 904. Results from blocks 902 and 904 are summed in block 906. The sum produced from block 906 is a second HDR image HDR2(x,y) 908, which is a final flicker corrected HDR image. HDR2(x,y) may be expressed as:

$$HDR2(x,y) = [S(x,y) \times W(x,y)] + [HDR1(x,y) \times (1 - W(x,y))]$$

A first HDR image is produced by a combination including an image produced by the second pixels, and images produced by multiple exposures of the first pixels. A weight map of LED flicker correction is generated from the difference of the image produced by second pixels and the images produced by the first pixels, and the flicker areas in the first HDR image are corrected with the weight map and the image from the second pixels.

Figure 10:
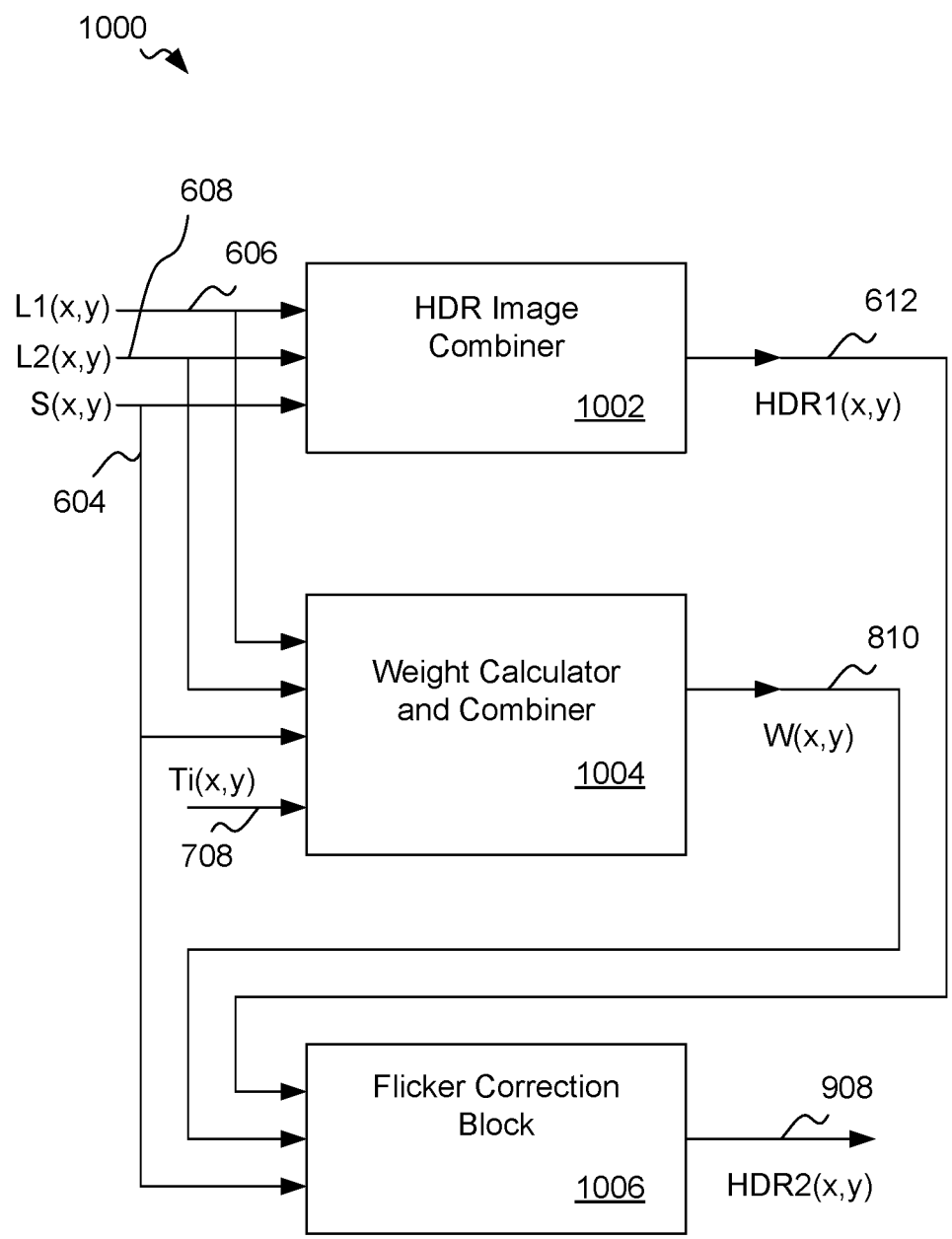
FIG. 10 shows a combination of FIGS. 6-9, according to an embodiment of the invention.

FIG. 10 shows a process 1000, which is combination of FIGS. 6-9, according to an embodiment of the invention. A block of HDR image combiner 1002 is equivalent to a block of HDR image combiner 602 of FIG. 6. A block of weight calculator and combiner 1004 is equivalent to a block of individual weight calculator 702 of FIG. 7 and a block of total weight combiner 802 of FIG. 8. A block of flicker correction 1006 is equivalent to final flicker correction 900 of FIG. 9.

Refer back to FIG. 4, for a split pixel 402, if the position of SPD 406 is shifted considerably from the position of LPD 404, S(x,y) may be corrected with respect to L1(x,y). L1(x,y), L2(x,y), ... are of the same LPD 404, thus they are not corrected to each other.

Figure 11:
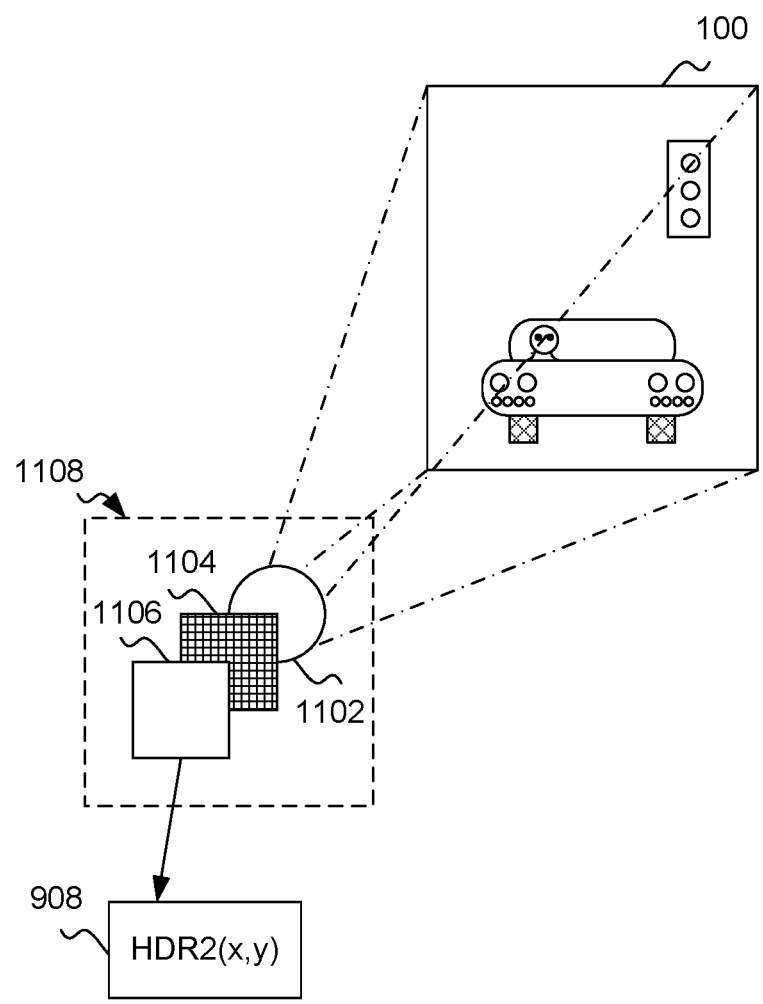
FIG. 11 shows a camera comprising a lens system, an image sensor, and a processor, according to an embodiment of the invention.

FIG. 11 shows a camera 1108 comprising a lens or lens system 1102, an image sensor 1104, and a processor 1106, according to an embodiment of the invention. For example, camera 1108 captures field of view 100 of FIG. 1. Lens system 1102 formed an image of field of view 100 on image sensor 1104. Image sensor 1104 comprises a plurality of split pixels, e.g., split pixels 402 of FIG. 4, including pixels having higher effective gain (LPD) and pixels having lower effective gain (SPD). Processor 1106 may represent process 1000 of FIG. 10. A final flicker corrected HDR image, which is HRD2(x,y) 908 of FIGS. 9 and 10, is outputted from processor 1106.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A system for capturing a high dynamic range (HDR) image comprising:
   an image sensor comprising a split pixel including a first pixel having higher effective gain and a second pixel having lower effective gain;
   wherein the first pixel is multiple exposed including a first exposure and a second exposure within a first pixel frame;
   wherein the second pixel is exposed with a capture window within a second pixel frame, the capture window captures at least one pulse emitted by a light emitting diode (LED) controlled by a pulse width modulation;
   wherein a first HDR image is produced by a combination including an image produced by the second pixel, a first image produced by the first exposure of the first pixel, and a second image produced by the second exposure of the first pixel; and
   a processor, wherein a final flicker corrected HDR image is outputted from the processor, and wherein the final flicker corrected HDR is produced as follows:

$$HDR2(x,y) = [S(x,y) \times W(x,y)] + [HDR1(x,y) \times (1 - W(x,y))],$$

wherein:
   0≤W(x,y)≤1,
   wherein HDR2(x,y) is the final flicker corrected HDR image, S(x,y) is the image produced by the second pixel, HDR1(x,y) is the first HDR image, and W(x,y) is a total weight, which is a function of individual weights and the individual weight is a function of an absolute value of difference between the image produced by the second pixel, and an image produced by the first pixel, and a noise model based threshold.

2. The system of claim 1, wherein the first exposure has a first exposure time and the second exposure has a second exposure time, the first exposure time is longer than the second exposure time.

3. The system of claim 1, wherein the first pixel frame is same as the second pixel frame.

4. The system of claim 1, wherein the first pixel is multiple exposed including more than two exposures.

5. The system of claim 1, wherein the second pixel has smaller area than the first pixel.

6. The system of claim 1, wherein the second pixel is covered by an attenuator.

7. The system of claim 1, wherein an effective gain of the first pixel and an effective gain of the second pixel are controlled by an electric circuit designed such that the effective gain of the second pixel is lower than the effective gain of the first pixel.

8. A method for capturing a high dynamic range (HDR) image comprising:
capturing an image by lower effective gain pixels of split pixels of an image sensor, wherein a capture window captures at least one pulse emitted by a light emitting diode (LED) controlled by a pulse width modulation, wherein the capture window is within a frame of the lower effective gain pixel;
capturing a first image by higher effective gain pixels of the split pixels of the image sensor with a first exposure;
capturing a second image by the higher effective gain pixels of the split pixels of the image sensor with a second exposure;
wherein the first exposure and the second exposure are within a frame of the higher effective gain pixel;
combining at least the image captured by the lower effective gain pixels of slit pixels of the image sensor, the first image and the second image captured by the higher effective gain pixels of the split pixels of the image sensor to produce a first HDR image; and producing a final flicker corrected HDR image as follows:

$$HDR2(x,y)=[S(x,y)\times W(x,y)]+[HDR1(x,y)\times(1-(x,y))],$$

wherein:
$0 \leq W(x,y) \leq 1$,
wherein HDR2 x,y) is the final flicker corrected HDR image, S(x,y) is the image captured by the second pixel, HDR1(x,y) is the first HDR image, and W(x,y) is a total weight, which is a function of individual weights, and the individual weight is a function of an absolute value of difference between the image produced by the second pixel and image produced by the first pixel, and a noise model based thresholds.

9. The system, of claim 8, wherein the first exposure has a first exposure time and the second exposure has a second exposure time, the first exposure time is longer than the second exposure time.

10. The method of claim 8, wherein the frame of the higher effective gain pixel is same as the frame of the lower effective gain pixel.

11. A camera for capturing a high dynamic range (HDR) image comprising:
an image sensor comprising a plurality of split pixels, each split pixel includes a first pixel having higher effective gain and a second pixel having lower effective gain;
a lens system forming an image of an field of view including a light emitting diode (LED) on the image sensor;
wherein the first pixel is multiple exposed including a first exposure and a second exposure within a first pixel frame;
wherein the second pixel is exposed with a capture window within a second pixel frame, the capture window captures at least one pulse emitted by the LED controlled by a pulse width modulation;
wherein a first HDR image is produced by a combination including an image produced by the second pixel, a first image produced by the first exposure of the first pixel, and a second image produced by the second exposure of the first pixel; and
a processor, wherein a final flicker corrected HDR image is outputted from the processor, and wherein the final flicker corrected HDR is produced as follows:

$$HDR2(x,y)=[S(x,y)\times W(x,y)]+[HDR1(x,y)\times W(1-W(x,y))],$$

wherein:
$0 \leq W(x,y) \leq 1$,
wherein HDR2(x,y) is the final flicker corrected HDR image, S(x,y) is the image produced by the second pixel, HDR1(x,y) is the first HDR image, and W(x,y) is a total weight, which is a function of individual weights, and the individual weight is a function of an absolute value of difference between the image produced by the second pixel and an image produced by the first pixel, and a noise model based thresholds.

12. The camera of claim 11, wherein the first exposure has a first exposure time and the second exposure has a second exposure time, the first exposure time is longer than the second exposure time.

13. The camera of claim 11, wherein the first pixel frame is same as the second pixel frame.

14. The camera of claim 11, wherein the second pixel has smaller area than the first pixel.

15. The camera of claim 11, wherein the second pixel is covered by an attenuator.

16. The camera of claim 11, wherein an effective gain of the first pixel and an effective gain of the second pixel are controlled by an electric circuit designed such that the effective gain of the second pixel is lower than the effective gain of the first pixel.

17. The camera of claim 11, wherein the first pixel is multiple exposed including more than two exposures.

* * * * *